United States Patent
Gugel et al.

(10) Patent No.: US 9,528,484 B2
(45) Date of Patent: Dec. 27, 2016

(54) VALVE FOR A PUMP

(71) Applicant: Continental Automotive GmbH, Hannover (DE)

(72) Inventors: Bernd Gugel, Regensburg (DE); Luc Van Himme, Laarne (BE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/427,558

(22) PCT Filed: Oct. 10, 2013

(86) PCT No.: PCT/EP2013/071211
§ 371 (c)(1),
(2) Date: Mar. 11, 2015

(87) PCT Pub. No.: WO2014/057060
PCT Pub. Date: Apr. 17, 2014

(65) Prior Publication Data
US 2015/0345449 A1    Dec. 3, 2015

(30) Foreign Application Priority Data
Oct. 12, 2012   (DE) .................. 10 2012 218 593

(51) Int. Cl.
*F02M 59/46* (2006.01)
*F16K 31/06* (2006.01)
(Continued)

(52) U.S. Cl.
CPC ......... *F02M 59/466* (2013.01); *F02M 59/368* (2013.01); *F02M 63/0035* (2013.01);
(Continued)

(58) Field of Classification Search
CPC  F02M 59/466; F02M 59/368; F02M 63/0035; F02M 63/0036; F16K 1/34; F16K 31/0655
(Continued)

(56) References Cited

U.S. PATENT DOCUMENTS 2,935,995 A * 5/1960 Rucker ............... F04B 53/1027
                                                137/329.04
3,829,060 A    8/1974 von Lewis ............... 251/129.02
(Continued)

FOREIGN PATENT DOCUMENTS

DE    2052307 A1    5/1972    ................ B60T 8/36
DE    2208183 A1    8/1973    ................ B60T 8/36
(Continued)

OTHER PUBLICATIONS

International Search Report and Written Opinion, Application No. PCT/EP2013/071211, 9 pages, Jan. 30, 2014.

*Primary Examiner* — William McCalister
*Assistant Examiner* — Ian Paquette
(74) *Attorney, Agent, or Firm* — Slayden Grubert Beard PLLC

(57) ABSTRACT

A valve for a pump for delivering fuel includes a closing element mounted in a valve body so as to be movable along an axis, wherein the closing element is designed to close off a duct of the pump, wherein an actuator is provided which is operatively connected to the closing element, wherein the closing element has a first contact surface, wherein the actuator has a second contact surface, wherein the closing element and the actuator are in contact with one another via the contact surfaces, and wherein the contact surfaces are at least partially in the form of spherical surfaces.

18 Claims, 3 Drawing Sheets

(51) Int. Cl.
*F16K 1/34* (2006.01)
*F02M 63/00* (2006.01)
*F02M 59/36* (2006.01)

(52) U.S. Cl.
CPC ........... *F02M 63/0036* (2013.01); *F16K 1/34* (2013.01); *F16K 31/0655* (2013.01)

(58) Field of Classification Search
USPC .......................... 251/129.02, 129.15, 129.19
See application file for complete search history.

(56) References Cited

U.S. PATENT DOCUMENTS

| | | | | |
|---|---|---|---|---|
| 4,653,720 A | * | 3/1987 | Knapp | F02M 51/0621 239/452 |
| 4,708,289 A | * | 11/1987 | Szablewski | F02M 51/0671 239/125 |
| 4,779,838 A | * | 10/1988 | Greiner | F02M 51/0621 239/585.4 |
| 5,239,968 A | * | 8/1993 | Rodriguez-Amaya | F02M 59/366 123/458 |
| 5,347,970 A | | 9/1994 | Pape et al. | 123/506 |
| 5,954,487 A | | 9/1999 | Straub et al. | 417/505 |
| 6,186,474 B1 | | 2/2001 | Fitzner et al. | 251/229 |
| 6,268,784 B1 | | 7/2001 | Feigel et al. | 335/261 |
| 7,036,788 B1 | | 5/2006 | Schneider et al. | 251/86 |
| 7,219,697 B2 | | 5/2007 | Neumair et al. | 137/870 |
| 7,857,282 B2 | | 12/2010 | Goossens | 251/129.07 |
| 2005/0279956 A1 | | 12/2005 | Berger et al. | 251/77 |

FOREIGN PATENT DOCUMENTS

| | | | |
|---|---|---|---|
| DE | 7335302 U | 4/1974 | ............ F16K 31/06 |
| DE | 4243665 A1 | 6/1994 | ............ F02M 57/02 |
| DE | 19700979 A1 | 7/1998 | ............ B60T 15/02 |
| DE | 19917756 A1 | 1/2000 | ............ B60T 8/36 |
| DE | 10255740 A1 | 6/2004 | ............ F16K 31/06 |
| DE | 10332345 A1 | 8/2004 | ............ B60T 8/36 |
| DE | 202004002432 U1 | 7/2005 | ............ F15B 13/04 |
| DE | 102004028968 A1 | 1/2006 | ............ F16K 1/44 |
| DE | 102008018018 A1 | 10/2009 | ............ F04B 1/04 |
| JP | 62151481 A | 7/1987 | ............ C08L 25/00 |
| JP | 2003120468 A | 4/2003 | ............ F02M 37/00 |
| JP | 2011169415 A | 9/2011 | ............ F16K 31/06 |
| WO | 2014/057060 A1 | 4/2014 | ............ F02M 59/36 |

* cited by examiner

VALVE FOR A PUMP

CROSS-REFERENCE TO RELATED APPLICATIONS

This application is a U.S. National Stage Application of International Application No. PCT/EP2013/071211 filed Oct. 10, 2013, which designates the United States of America, and claims priority to DE Application No. 10 2012 218 593.3 filed Oct. 12, 2012, the contents of which are hereby incorporated by reference in their entirety.

TECHNICAL FIELD

The invention concerns a valve for a pump and a pump for delivering fuel.

BACKGROUND

The prior art, for example DE 10 2008 018 018 A1, discloses a pump for delivery of a fluid. The pump has a cylinder housing surrounding a cylinder chamber. A pump piston is arranged axially moveably in the cylinder chamber. A closing body in a closed position blocks a fluid flow from a fluid supply line to the cylinder chamber, and otherwise releases the fluid flow. The pump has a controllable actuator comprising an actuator housing of an electrically insulating material. The closing body is coupled to the actuator. The actuator has a magnetic rotor, which is actively connected with the closing body.

DE 10 2004 028 968 A1 discloses a valve with a secure opening display. The valve has a magnetic drive, wherein a rotor is inserted via a semi-spherical end piece into a semi-spherical recess of a closing element.

DE 103 32 345 A1 discloses an electromagnetic valve, the valve closing element of which is arranged self-centering about a rotation point between the valve lifter and the valve seat.

DE 102 55 740 A1 discloses a directly controlled, proportional, pressure-limiting valve. The valve has a valve cone which can be actuated by means of a rotor of a proportional magnet. The valve cone is supported on universal joints in the rotor. The valve cone is further guided by the housing-side guide, wherein the play between the valve cone and the housing-side guide is less than the play between the valve cone and the rotor.

DE 197 00 979 A1 discloses a magnetic valve with a rotor acting on a closing element in order to open or close a valve seat.

DE 22 08 183 discloses a magnetic valve in which a closing element is actively connected to the rotor via a ball.

DE 20 52 307 discloses an electromagnetically actuated seat valve in which the rotor is coupled to a valve lifter via a universal joint connection.

DE 20 2004 002 432 U1 discloses a double magnetic valve with two adjacent valve elements which can be actuated in the closing direction against spring force by a common magnet via a T-shaped force transmission element, which is guided with a shaft with a sliding guide in the actuation direction of the valve elements, wherein a radial safety clearance is provided between the sliding guide and the shaft, and wherein on the side of the sliding guide facing away from the valve elements, a tilting hinge joint is provided between the shaft of the force transmission element and the rotor or a moveably guided rotor plunger of the magnet.

DE 73 35 302 U discloses a magnetic valve, wherein the rotor is fitted with a sleeve, wherein a ball is arranged in the sleeve and opens or closes a line depending on the position of the rotor.

DE 199 17 756 A1 concerns an electromagnetic valve with a valve housing which receives a valve seat in a housing opening, with a plunger-like valve closing element which can be placed on the valve seat and can connect or isolate pressure-medium channels leading to the valve seat, with a magnetic rotor arranged axially moveably in the valve housing to receive the valve closing element which is mounted moveably on the magnetic rotor by means of a hinge joint, wherein the valve closing element together with the magnet rotor forms a sub-assembly which can be handled autonomously. The rotor has a rotor bore formed as a tapered stepped bore, whereby firstly the taper step allows a constant bearing surface, which is easy to produce, to receive the conical hinge, and which above the hinge is connected to the rotor bore for almost complete accommodation of the compression spring with constant cross section, while below the hinge the taper step transforms into the relatively narrow rotor bore in which the valve closing element is safely guided for articulated orientation with little radial play.

SUMMARY

One embodiment provides a valve for a pump for delivering fuel, with a housing and with a closing element, wherein the closing element is guided moveably along an axis in the housing, wherein the closing element is configured to close a channel of the pump, wherein an actuator is provided, wherein the closing element has a first contact face, wherein the actuator has a second contact face, wherein the closing element and the actuator are actively connected to each other via the contact faces, wherein the actuator is configured as a magnetic coil and a magnetic rotor, and wherein the second contact face is formed on the rotor, wherein the rotor has a recess through which the closing element is guided, and wherein the second contact face is formed on the rotor adjacent to the recess, characterized in that the two contact faces are configured as part of a spherical surface.

In a further embodiment, at least one semi-spherical surface has a constant radius.

In a further embodiment, the contact face is formed as part of a convex spherical surface.

In a further embodiment, one contact face is formed as part of a convex spherical surface and the other contact face is formed as part of a concave spherical surface.

In a further embodiment, the concave spherical surface has a larger radius than the convex spherical surface, wherein the contact faces are formed as an annular part of a spherical surface and wherein preferably an annular contact line is present between the convex and the concave contact faces in a middle of a width of the annular concave semi-spherical surface.

In a further embodiment, the differences in the radii are up to 20%, in particular up to 15%, preferably up to 5%.

In a further embodiment, the semi-spherical surfaces are formed and arranged such that the center points of the semi-spherical surfaces are arranged laterally offset.

In a further embodiment, the radii of the spherical surfaces are in the meter range.

In a further embodiment, a separate bush is attached to the closing element, wherein the contact face is formed on the bush.

In a further embodiment, the closing element has a guide portion with a guide surface, wherein the closing element is axially guided with the guide portion in the housing, and wherein the rotor has at least one channel, wherein the channel opens into the recess and is provided for supplying fluid from the channel into the region of the contact faces.

In a further embodiment, the housing has a guide part, wherein the closing element is guided in the guide part, wherein the guide part has a further channel which is connected at one end to the channel of the housing and at the other end to the channel of the rotor.

Another embodiment provides a pump for delivering fuel to an engine of a vehicle with a valve as disclosed above.

BRIEF DESCRIPTION OF THE DRAWINGS

Example embodiments of the invention are discussed in more detail below with reference to the figures, in which.

DETAILED DESCRIPTION

Figure 1:
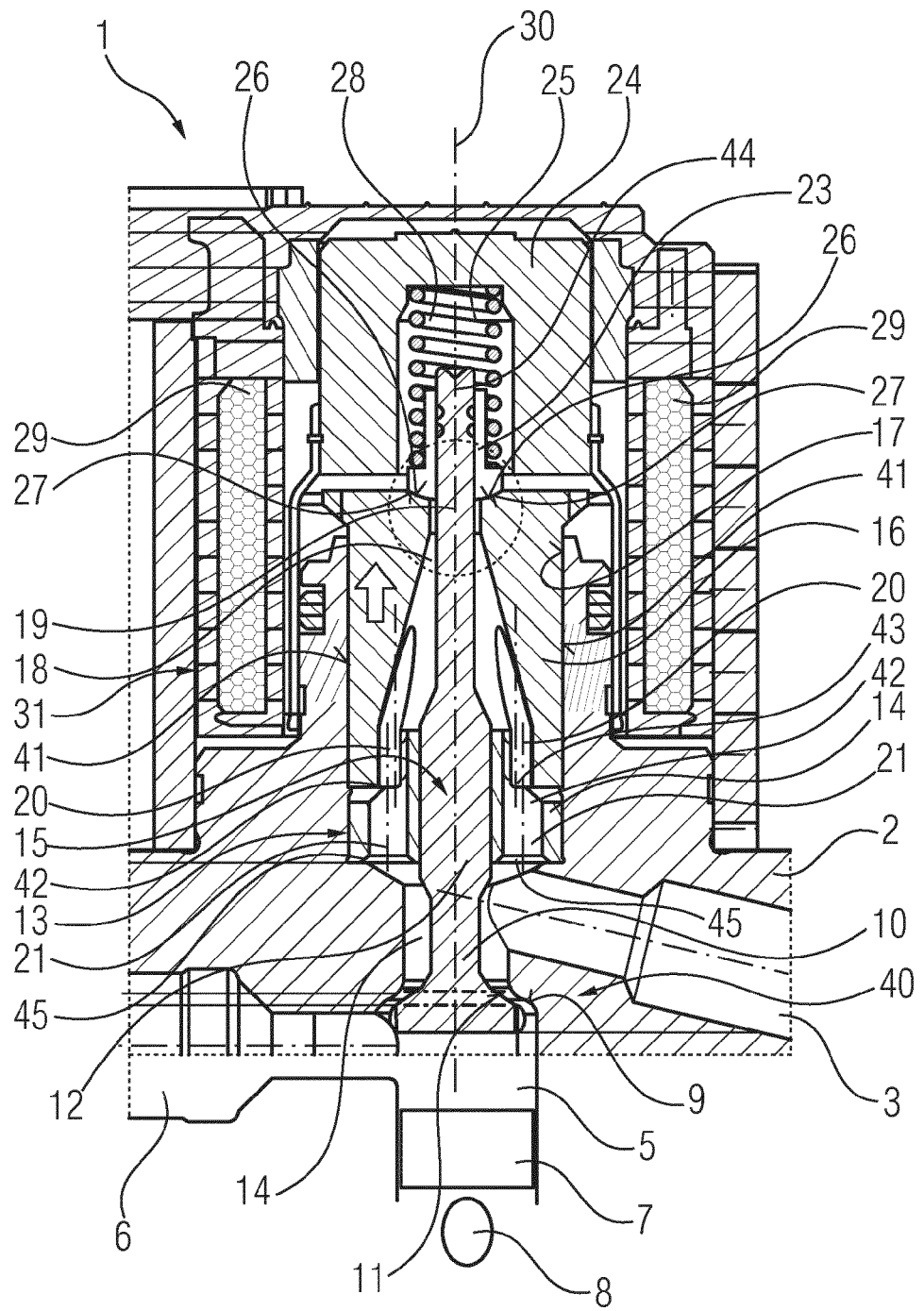
FIG. 1 is a diagrammatic, partial extract of a pump for fuel.

Embodiments of the invention provide an improved valve and an improved pump, wherein wear on the contact faces between the actuator and the closing body may be reduced.

In one embodiment, the actuator is configured as a magnetic coil and a magnetic rotor, wherein the contact face of the actuator is formed on the rotor. By using a rotor as part of the actuator, a simpler actuator is achieved with optimized construction size. Also the rotor has a recess through which the closing element is guided. The contact face of the rotor is formed adjacent to the recess.

One advantage of the valve described is that the abrasion of the contact faces of the closing element and the actuator is reduced. This is achieved because the contact faces of the closing element and the actuator are formed as semi-spherical surfaces. The configuration as semi-spherical surfaces gives reduced abrasion. By forming at least one of the contact faces as a semi-spherical surface, abrasion is also low when the closing element has an axially oblique position relative to the actuator. Also the actual contact area is still relatively large in this oblique position. The semi-spherical surface may have any type of curvature, in particular the radius of curvature may vary.

Since the contact faces are formed as semi-spherical surfaces, the actual contact surface area is increased so that abrasion is further reduced. Also the negative influence of an axially oblique position on the actual contact surface area, and hence the abrasion, is further reduced.

In a further embodiment, at least one contact face has the form of part of a spherical surface with constant radius. By forming the contact faces as spherical surfaces, abrasion in an axially oblique position of the closing element relative to the actuator is reduced further. Also it is relatively simple and economic to form the spherical surface with a constant radius.

In a further embodiment, the two contact faces are each formed as part of a spherical surface with constant radius. By forming the spherical surfaces as spherical surfaces with constant radius, abrasion at the contact faces is low even if the actuator and/or the closing element are not oriented precisely parallel to each other in the axial direction.

In a further embodiment, the two contact faces are formed as part of a convex spherical surface. In this way a reduction in abrasion can be achieved with low requirements for precision of the spherical surfaces.

In a further embodiment, the radii lie in the meter range. Due to the large radii, in particular in the formation of two convex contact faces, in particular with convex spherical faces, a large contact area is achieved, and a large contact area and hence low abrasion is still achieved when the contact faces are tilted relative to each other.

In a further embodiment, the spherical surfaces of the two contact faces have different radii. This is advantageous in particular when forming a convex-concave arrangement of the contact faces. When a large radius is used for the convex spherical surface and a small radius for the concave spherical surface, a large contact area can also be achieved without deformation when the two contact faces have an axially oblique position.

In one embodiment, one contact face is formed at least partially convex and the other contact face at least partially concave. By pairing a convex spherical surface with a concave spherical surface, a large contact area is provided between the actuator and the closing element, which also allows a large contact area when the actuator is tilted relative to the closing element. Abrasion is therefore further reduced.

Furthermore, in actuation of the valve, situations occur in which a gap is present between the contact faces of the actuator and of the closing element.

In this situation, the form of the spherical surfaces—in particular in the convex-concave pairing—leads to the hydraulic damping of the mutual impact between the contact faces since the space between the contact faces is filled with fluid, in particular with fuel. Thus as well as the large contact area, even on axial tilting a further hydraulic damping with the fluid is still achieved.

In a further embodiment, the curvatures, in particular the radii of the convex and concave contact faces, are selected such that an annular contact area is created between the convex and concave contact faces in the middle of the annular concave contact face, in particular the concave semi-spherical surface. In this way the maximum size of contact area is achieved even on axially oblique positioning of the closing element. Also the formation of the hydraulic damping cushion is supported.

In a further embodiment, the contact faces are formed as semi-spherical surfaces, wherein the center axes of the semi-spherical surfaces are laterally offset. This gives a laterally skewed position which leads to a slightly larger gap between the contact faces. The enlarged gap supports the formation of the fluid damping cushion between the contact faces.

In a further embodiment, a bush is attached to the closing element, wherein the contact face of the closing element is formed on the bush. Use of the bush allows simple and economic production of the contact face, since the contact face is produced on the bush before the bush is fixed to the closing element. Production of the contact face on an integral closing element is substantially more complex and hence more expensive. Also a different material can be used to form the bush, in particular a material with a harder surface coating than that used to form the closing element.

The two-part formation of the closing element gives increased flexibility in the production processes and materials used.

In a further embodiment, the closing element has a portion with a guide surface, wherein the closing element is axially guided with the portion in the valve housing and wherein the rotor has at least one further channel, wherein the further channel opens into the recess and is provided for supplying fluid from the channel into the region of the contact faces.

In a further embodiment, the valve housing has a further channel via which fluid, in particular fuel, can be supplied to the region of the contact faces. This helps support the formation of the hydraulic damping cushion which is formed by the fluid between the contact faces. Sufficient pressure predominates in the channel of the valve housing to ensure the formation of the hydraulic cushion.

FIG. 1 shows, in a diagrammatic partial depiction, a pump 1 for delivering a fluid. The pump 1 may for example take the form of a fuel pump, in particular a high-pressure pump for fuel. The pump 1 has a housing 2 in which a first channel 3 is produced. The first channel 3 opens into a supply chamber 4 and constitutes a supply channel. The supply chamber 4 is connected to a pressure chamber 5. The pressure chamber 5 is connected to a second channel 6 which constitutes a discharge channel. The first channel 3 may for example be connected to a pre-delivery pump or a fuel tank. The second channel 6 may be connected to a fuel storage unit or to injectors. A pump piston 7 is guided axially moveably in the pressure chamber 5. The pump piston 7 is forced by a drive shaft 8 into axial up and down movements. In a transition region 40 formed between the supply chamber 4 and the pressure chamber 5, a sealing seat 9 is arranged on the housing 2. A second sealing seat 11 is assigned to the sealing seat 9 and is formed on a closing element 10. The sealing seat 9 and the second sealing seat 11 are each formed as ring faces. The closing element 10 with the second sealing seat 11 is located inside the pressure chamber 5. The diameter of the pressure chamber 5 tapers in the transition region in the direction of the supply chamber 4. The closing element 10 is guided through the supply chamber 4. The supply chamber 4 is connected to a valve chamber 13 opposite the pressure chamber 5. In the valve chamber 13, a guide part 14 is arranged adjacent to the supply chamber 4. The guide part 14 has a central bore 15 with a guide surface. The closing element 10 has a guide portion 12 which is arranged in the bore 15 and is guided axially by the guide surface of the bore 15 in a center axis 30. Above the guide part 14, a rotor 16 is arranged in the valve chamber 13. The rotor 16 is formed cylindrical and at one radial outside has a guide surface 17 in the form of a cylinder casing surface. The valve chamber 13 is formed cylindrical and has a second guide surface 41 for the rotor 16. The rotor 16 is made of a magnetic material and is arranged axially moveably along the center axis 30 in the valve chamber 13. The rotor 16 also has a second bore 18 through which a portion 19 of the closing element 10 is guided. The portion 19 of the closing element 10 protrudes with an end piece 44 beyond the rotor 16 in a direction opposite to the pressure chamber 5. The second bore 18 of the rotor 16 is in connection with at least one further channel 20 of the rotor 16, wherein the further channel is guided from an underside 43 of the rotor to the second bore 18. Also the guide part 14 has an additional channel 21 which runs from a top side 42 of the guide part 14 to an underside 45 of the guide part 14. The additional channel connects the supply chamber 4 to the further channel 21 of the rotor 16. In this way a hydraulic connection is created between the supply chamber 4 and the second bore 18.

The valve chamber 13 is closed with a housing cover 24, wherein a receiver opening 25 is formed in the housing cover 24, into which the end piece 44 of the closing element 10 projects. Opposite the second valve seat 11, on the end piece 44 outside the rotor 16, the closing element 10 has a bush 23 which is formed as a separate component and is fixedly connected to the closing element 10. A spring 28 is arranged in the receiver opening 25 and is clamped between the housing cover 24 and the bush 23. The bush 23 has a first contact face 26 which is assigned to a second contact face 27 of the rotor 16. The second contact face 27 is formed adjacent to the bore 16 on a top side of the rotor 16.

In certain situations, the first contact face 26 lies with a contact area on the second contact face 27. The first and second contact faces 26, 27 are formed rotationally symmetrical to the center axis 30, and in the plane of the center axis have a radius of curvature which may vary. Thus the contact faces 26, 27 have the form of semi-spherical surfaces. The valve chamber 13 is surrounded by a magnetic coil 29 which, together with the rotor 16, forms an actuator to actuate the closing element 10. The actuator and the closing element form an electromagnetic valve 31.

In the situation depicted, the spring 28 pretensions the closing element 10 in contact with the rotor 16, wherein the first contact face 26 of the bush 23 lies with a contact area on the second contact face 27 of the rotor 16. Here the supply chamber 4 is connected to the pressure chamber 5, i.e. the valve 31 is in an open position. In the open position of the valve 31, the pump 1 can draw in fluid, in particular fuel, via the first channel 3 due to the downward movement of the pump piston 7. After suction, for the compression process the valve 31 is closed by corresponding power application to the magnetic coil 29, i.e. the closing element 10 is brought to lie with the second sealing seat 11 on the sealing seat 9 of the housing 2. When the magnetic coil 29 is powered, the rotor 16 is moved upward i.e. away from the sealing seat 9. The rotor 16 presses the second contact face 27 onto the first contact face 26 of the bush 23, and hence the closing element 10 is moved upward. Since fuel is guided between the contact faces 26, 27 via the bores in the guide part 14 and in the rotor 16, a hydraulic fluid film is present between the contact faces 26, 27. This is not completely displaced upward even on upward movement of the rotor and a consequential movement of the bush 23 and closing element 10. Only when the second sealing seat 11 meets the sealing seat 9 is the rotor 16 pressed more strongly against the bush 23, so that the fluid film is fully displaced out of the region between the contact faces 26, 27. In this way a hydraulic damping of the impact of the second contact face 27 on the first contact face 26 is attenuated. When the valve 31 is closed, an upward movement of the pump piston 7 delivers the fuel with increased pressure into the second channel 6. The second channel 6 may have a check valve which prevents the return of fluid from the second channel 6 into the pressure chamber 5.

To open the valve 31, it is sufficient to shut off the power through the magnetic coil. The spring 28 was compressed on closure of the valve 31. When the magnetic force is absent, the spring 28 relaxes, wherein the closing element 10 is moved down and the second sealing seat 11 is lifted from the sealing seat 9. This opens the valve 31 so that a hydraulic connection exists between the pressure chamber 5 and the first channel 3.

Figure 2:
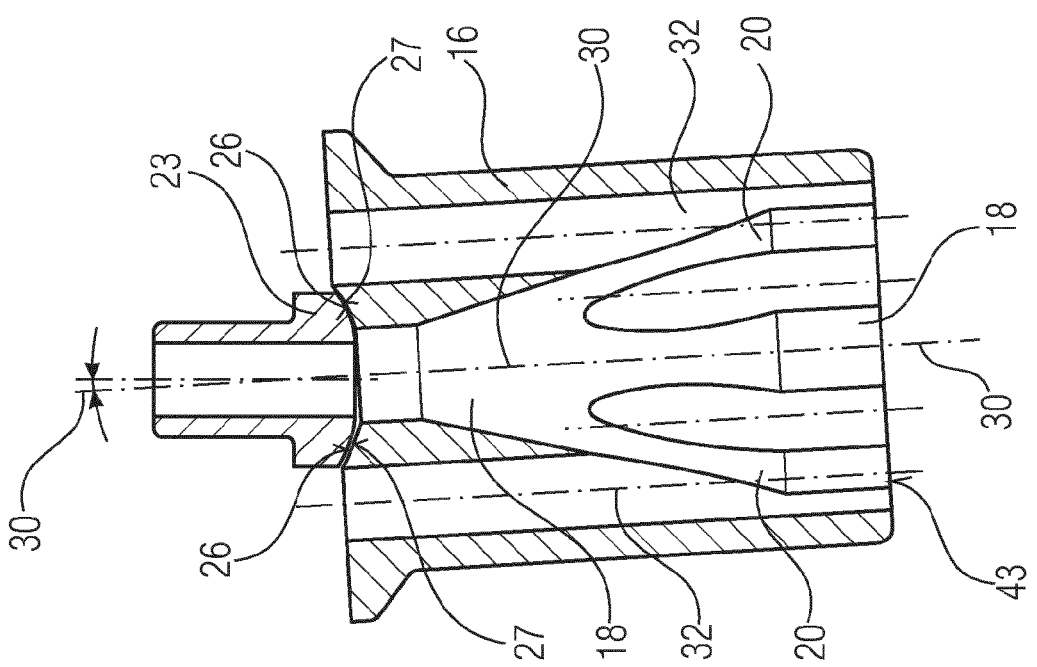
FIG. 2 is a diagrammatic depiction of the rotor and a bush of the closing element.

FIG. 2 shows, in a diagrammatic depiction, the rotor 16 and the bush 23. In this view, the further parts of the pump, in particular the closing element 10, are not shown for simplification. By forming the first and second contact faces 26, 27 in the form of a convex and a concave spherical surface, i.e. a ball-cup connection, the mechanical abrasion of the contact faces, i.e. the wear, is reduced. This is achieved firstly in that, on a poor alignment of the axial orientation of the bush 23 to the center axis of axis 30, nonetheless a large contact area exists between the contact faces 26, 27. Also the semi-spherical surfaces of the contact faces 26, 27 are improved by the hydraulic damping cushion. In particular on poor alignment of the bush and/or rotor relative to the center axis 30, the formation of the hydraulic damping cushion is supported. FIG. 2 shows a position of the bush 23 skewed by three angular degrees relative to the center axis 30 and the rotor 16. Due to the form of the semi-spherical surfaces, the contact faces lie on each other better despite this skewed position. Also the average distance between the contact faces 26, 27 is relatively small. Fluid collects between the contact faces 26, 27 and, in particular at the end of the rotor movement, i.e. on impact of the second sealing seat 11 on the first sealing seat 9, causes an advantageous hydraulic damping. In this way the wear on the contact faces between the rotor and the bush is reduced.

FIG. 2 clearly shows the second bore 18 and the further channels 20. In the exemplary embodiment shown, additional channels 32 are provided which run from an underside to a top side of the rotor 16. This improves a fluid exchange between the supply chamber 4 and the receiver opening 25.

Figure 3:
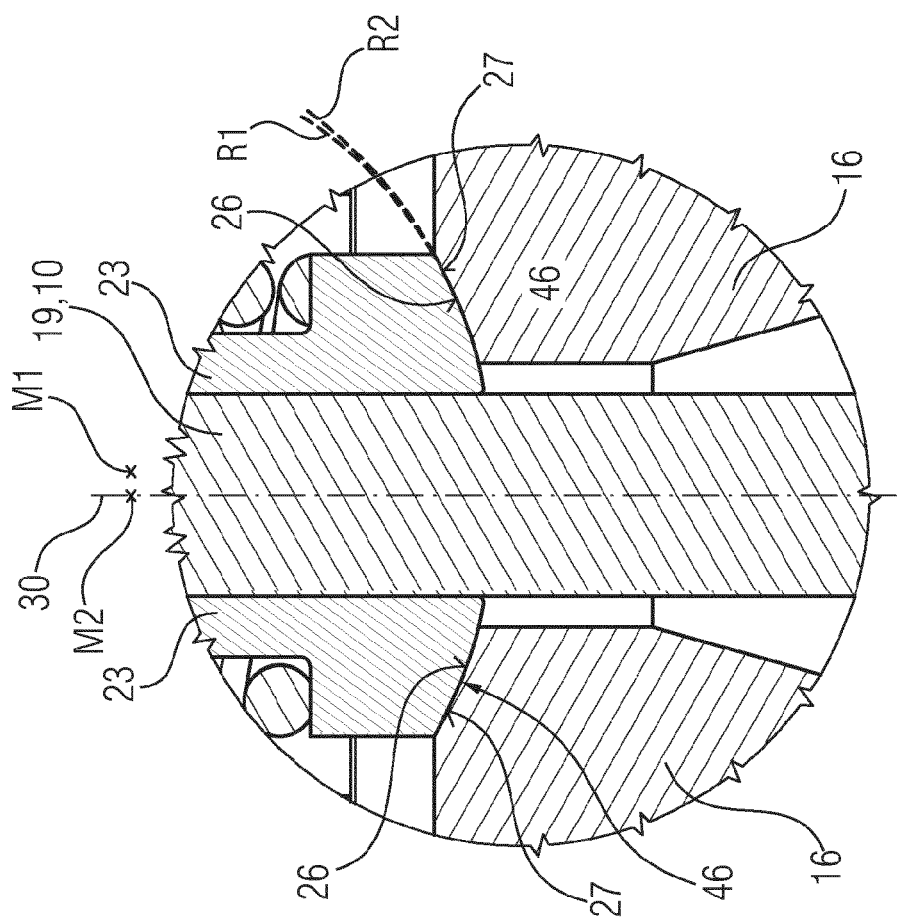
FIG. 3 is an enlarged diagrammatic depiction of the contact faces of the closing element and the rotor.

FIG. 3 shows, in an enlarged diagrammatic depiction, an extract of the bush 23 and rotor 16 with the first and second contact faces 26, 27. In the exemplary embodiment shown, the rotor 16 has a concave second contact face 27 in the form of annular semi-spherical surface. The bush 23 has a first contact face 26 in the form of a convex, annular, semi-spherical surface. In the exemplary embodiment shown, the first and second contact faces each have a constant radius, wherein the first radius R1 of the first contact face 26 is smaller than the second radius R2 of the second contact face 27. Depending on the embodiment selected, the radii of the semi-spherical surfaces of the first and second contact faces 26, 27 may be the same. Experiments have however shown that a better effect relative to the abrasion reduction is achieved if the concave semi-spherical surface of the second contact face 27 has a greater radius than the convex semi-spherical surface of the first contact face 26. Good damping properties are achieved in the region of up to 20% difference in the radii. Preferably the difference is 10% difference in the radii. A 10% difference in radii offers a good compromise between creation of a fluid damping cushion and the contact area between the two contact faces 26, 27.

Depending on the embodiment selected, the rotor 16 may have the convex semi-spherical surface and the bush 23 the concave semi-spherical surface as a contact face. Also, instead of the separate bush 23, the closing element may be formed integral and have a corresponding contact face.

In the embodiment shown, a center point M2 of the semi-spherical surface of the second contact face 27 lies on the center axis 30. A center point M1 of the first semi-spherical surface of the first contact face 26 is arranged laterally offset to the center axis 30. Due to the lateral offset of the center points of the semi-spherical surfaces, a slight misfit is created, supporting the formation of the fluid damping cushion. The lateral offset may for example be in the range of 10% of the radius or more. Furthermore, the lateral offset may be from 1% to 5% of the radius. In the embodiment of FIG. 3, the semi-spherical surfaces of the first and second contact faces 26, 27 are formed and arranged such that the contact faces 26, 27 touch in the form of a peripheral annular area in the central region 46 of the second contact face 27.

Figure 4:
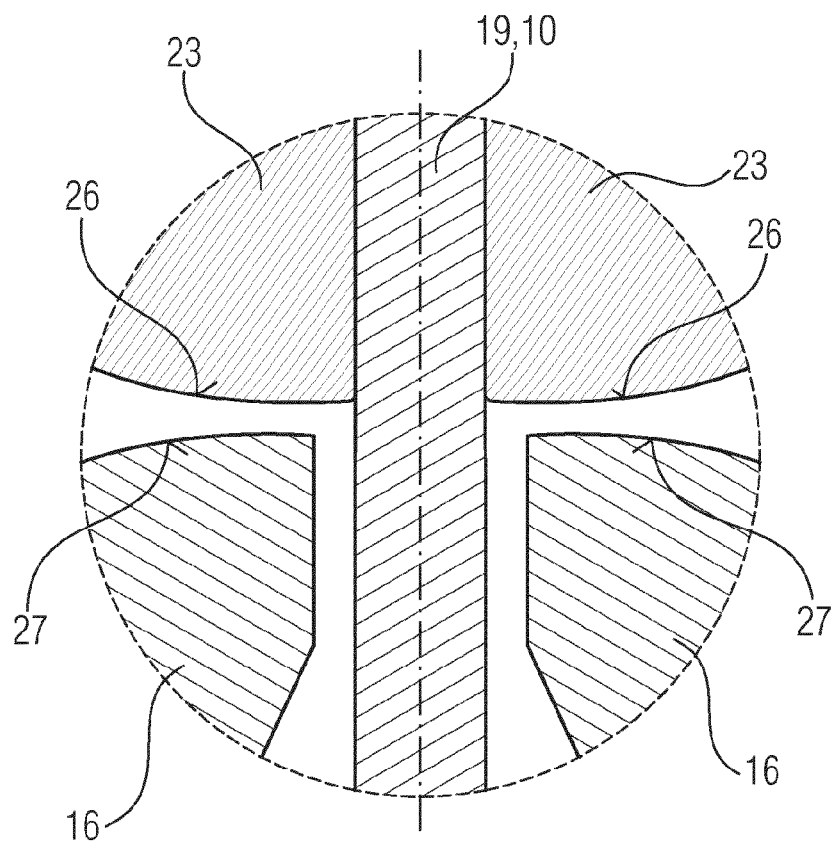
FIG. 4 is a diagrammatic depiction of an embodiment with two convex contact faces.

FIG. 4 shows, in a diagrammatic depiction, a partial extract of a further embodiment in which both the first contact face 26 of the bush 23 and the second contact face 27 of the rotor 16 have a convex semi-spherical surface. In this embodiment, the radii are relatively large and may lie in the meter range. Also the formation of two convex contact faces offers an improvement in relation to abrasion, compared with the formation of planar parallel contact faces. Firstly a poor alignment of the bush and/or the rotor relative to the axis 30 leads to a smaller reduction in the actual contact area, in comparison with planar parallel contact faces. Secondly, due to the convex formation of the contact faces, a better hydraulic damping cushion is formed between the contact faces.

Depending on the embodiment selected, the first and second contact faces 26, 27 may, in addition to the form of semi-spherical surfaces, have further contours and/or recesses which support the formation of a damping cushion.

Figure 5:
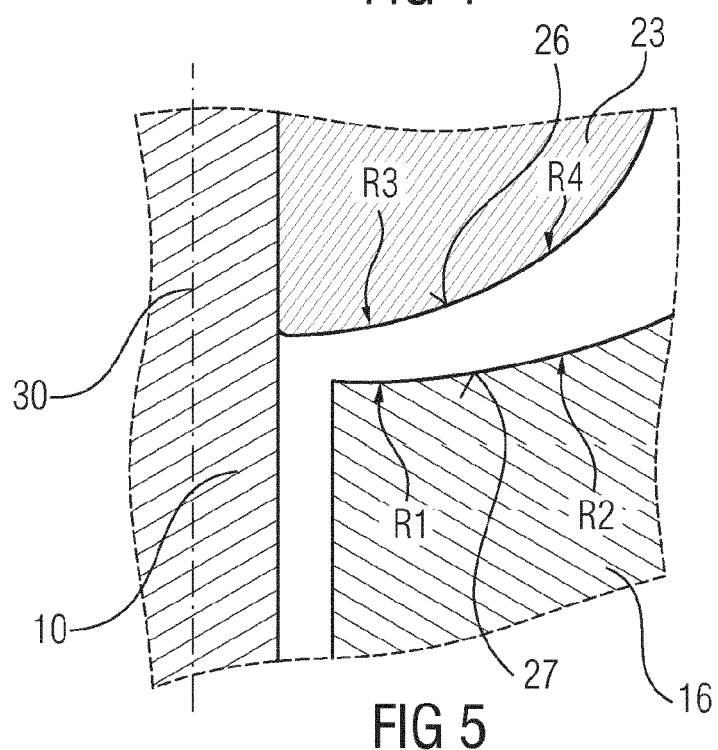
FIG. 5 is a diagrammatic depiction of a further embodiment with contact faces, the semi-spherical surfaces of which have several radii.

FIG. 5 shows, in a diagrammatic partial depiction, a view of a first and a second contact face 26, 27, wherein the contact faces have rotationally symmetrical semi-spherical surfaces relative to the center axis 30, wherein however the radius of the semi-spherical surfaces 26, 27 is not constant but varies depending on the distance from the center axis 30. The different radii R1, R2, R3, R4 are marked diagrammatically in the figure. A transition between the different radii is continuous.

What is claimed is:

1. A valve for a pump for delivering fuel, comprising:
   a housing;
   a closing element guided moveably along an axis in the housing, wherein the closing element is configured to close a channel of the pump, the closing element having a first contact face; and
   an actuator configured as a magnetic coil and a magnetic armature, wherein the armature has a recess through which the closing element is guided;
   wherein the actuator has a second contact face formed on the armature adjacent to the recess;
   wherein the closing element and the actuator are actively connected to each other via the first and second contact faces; and
   wherein each of the first and second contact faces comprises a semi-spherical surface and respective center points of the semi-spherical surfaces are laterally offset from each other.

2. The valve of claim 1, wherein at least one of the first and second semi-spherical surfaces has a constant radius.

3. The valve of claim 1, wherein one of the first and second contact faces comprises part of a convex spherical surface.

4. The valve of claim 1, wherein each of the semi-spherical surfaces has a radius of approximately one meter length.

5. The valve of claim 1, wherein a separate bush is attached to the closing element, wherein the first contact face is formed on the bush.

6. The pump of claim 1, wherein at least one of the first and second semi-spherical surfaces has a constant radius.

7. The pump of claim 1, wherein the contact face is formed as part of a convex spherical surface.

8. The valve of claim 1, wherein:
the closing element has a guide portion with a guide surface,
the closing element is axially guided with the guide portion in the housing,
the armature has at least one channel that opens into the recess and is provided for supplying fluid from the channel into the region of the contact faces.

9. The valve of claim 8, wherein the housing has a guide part in which the closing element is guided,
wherein the guide part has a further channel connected at one end to the channel of the housing and at the other end to the channel of the armature.

10. The pump of claim 1, wherein one of the first and second contact faces comprises a convex semi-spherical surface and the other one of the first and second contact faces comprises a concave semi-spherical surface.

11. The pump of claim 10, wherein:
the concave semi-spherical surface has a larger radius than the convex semi-spherical surface,
the contact faces are formed as an annular part of a spherical surface, and
an annular contact line is defined between the convex and the concave contact faces in a middle of a width of the annular concave semi-spherical surface.

12. The pump of claim 11, wherein a difference between the radius of the concave semi-spherical surface and the radius of the convex semi-spherical surface is less than or equal to 20%.

13. The valve of claim 1, wherein one of the first and second contact faces comprises a convex semi-spherical surface and the other one of the first and second contact faces comprises a concave semi-spherical surface.

14. The valve of claim 13, wherein:
the concave semi-spherical surface has a larger radius than the convex semi-spherical surface,
the contact faces are formed as an annular part of a spherical surface, and
an annular contact line is defined between the convex and the concave contact faces in a middle of a width of the annular concave semi-spherical surface.

15. The valve of claim 14, wherein a difference between the radius of the concave semi-spherical surface and the radius of the convex semi-spherical surface is less than or equal to 20%.

16. The valve of claim 14, wherein the difference between the radius of the concave spherical surface and the radius of the convex spherical surface is less than or equal to 15%.

17. The valve of claim 14, wherein the difference between the radius of the concave spherical surface and the radius of the convex spherical surface is less than or equal to 5%.

18. A pump for delivering fuel to an engine of a vehicle, the pump comprising:
a valve comprising:
a housing;
a closing element guided moveably along an axis in the housing, wherein the closing element is configured to close a channel of the pump, the closing element having a first contact face; and
an actuator configured as a magnetic coil and a magnetic armature, wherein the armature has a recess through which the closing element is guided;
wherein the actuator has a second contact face formed on the armature adjacent to the recess;
wherein the closing element and the actuator are actively connected to each other via the first and second contact faces; and
wherein each of the first and second contact faces comprises a semi-spherical surface and respective center points of the semi-spherical surfaces are laterally offset from each other.

* * * * *